United States Patent
Justynska-Reimann et al.

(10) Patent No.: US 10,809,181 B2
(45) Date of Patent: Oct. 20, 2020

(54) METHOD AND APPARATUS FOR DETERMINING A COEFFICIENT OF FRICTION AT A TEST SITE ON A SURFACE OF A CONTACT LENS

(71) Applicant: Novartis AG, Basel (CH)

(72) Inventors: Justyna Justynska-Reimann, Aschaffenburg (DE); Markus Grebe, Einhausen (DE); Michael Ruland, Dossenheim (DE); André Wicklein, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 244 days.

(21) Appl. No.: 16/109,815

(22) Filed: Aug. 23, 2018

(65) Prior Publication Data

US 2019/0064053 A1    Feb. 28, 2019

Related U.S. Application Data

(60) Provisional application No. 62/549,758, filed on Aug. 24, 2017.

(51) Int. Cl.
*G01N 19/02*    (2006.01)
(52) U.S. Cl.
CPC .................... *G01N 19/02* (2013.01)
(58) Field of Classification Search
CPC ...................................................... G01N 19/02
USPC ..................................................... 73/9, 105
See application file for complete search history.

(56) References Cited

U.S. PATENT DOCUMENTS

| | | | |
|---|---|---|---|
| 3,408,429 A | 10/1968 | Wichterle | |
| 4,136,250 A | 1/1979 | Mueller et al. | |
| 4,143,949 A | 3/1979 | Chen | |
| 4,153,641 A | 5/1979 | Deichert et al. | |
| 4,182,822 A | 1/1980 | Chang | |

(Continued)

FOREIGN PATENT DOCUMENTS

| | | |
|---|---|---|
| EP | 632329 A1 | 1/1995 |
| JP | 200175060 A | 3/2001 |
| WO | 2009094368 A1 | 7/2009 |

OTHER PUBLICATIONS

Nairn et al. "Measurement of the Friction and Lubricity Properties of Contact Lenses" Proceedings of ANTEC '95, Boston, MA, May 7-11, 1995. (Year: 1995).*

(Continued)

*Primary Examiner* — Nathaniel J Kolb
(74) *Attorney, Agent, or Firm* — Jian Zhou

(57) ABSTRACT

The present invention relates to a method and an apparatus (5) for determining a coefficient of friction at a test site (11) on a surface (10) of a contact lens (1). The apparatus comprises: a lens holder (2) arranged at least partially in a receptacle (6); a slide (4) comprising a counter surface (40) made of lapped aluminum for contacting the test site (11); a load generator (7) configured to apply a predetermined normal load (Fn) between the counter surface (40) and the test site; a drive (8) configured to generate a sliding movement between the counter surface (40) and the contact lens in direction located in a plane perpendicular to the normal load (Fn); and a force sensor (9) configured to measure a tangential frictional force (Ft) between the test site and the counter surface (40) along the direction of the sliding movement.

15 Claims, 1 Drawing Sheet

(56) References Cited

U.S. PATENT DOCUMENTS

| | | | |
|---|---|---|---|
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,312,575 A | 1/1982 | Peyman et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |
| 5,346,946 A | 9/1994 | Yokoyama et al. |
| 5,352,714 A | 10/1994 | Lai et al. |
| 5,358,995 A | 10/1994 | Lai et al. |
| 5,387,632 A | 2/1995 | Lai et al. |
| 5,416,132 A | 5/1995 | Yokoyama et al. |
| 5,451,617 A | 9/1995 | Lai et al. |
| 5,464,667 A | 11/1995 | Kohler et al. |
| 5,486,579 A | 1/1996 | Lai et al. |
| 5,508,317 A | 4/1996 | Müller |
| 5,583,163 A | 12/1996 | Müller |
| 5,599,576 A | 2/1997 | Opolski |
| 5,665,840 A | 9/1997 | Pohlmann et al. |
| 5,712,356 A | 1/1998 | Bothe et al. |
| 5,760,100 A | 6/1998 | Nicholson et al. |
| 5,766,158 A | 6/1998 | Opolski |
| 5,789,464 A | 8/1998 | Müller |
| 5,843,346 A | 12/1998 | Morrill |
| 5,849,810 A | 12/1998 | Müller |
| 5,849,841 A | 12/1998 | Muhlebach et al. |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,087,415 A | 7/2000 | Vanderlaan et al. |
| 6,096,726 A | 8/2000 | Opolski |
| 6,099,122 A | 8/2000 | Chabrecek et al. |
| 6,165,408 A | 12/2000 | Steinmann |
| 6,221,303 B1 | 4/2001 | Steinmann |
| 6,303,687 B1 | 10/2001 | Müller |
| 6,340,465 B1 | 1/2002 | Hsu et al. |
| 6,367,929 B1 | 4/2002 | Maiden et al. |
| 6,436,481 B1 | 8/2002 | Chabrecek et al. |
| 6,440,571 B1 | 8/2002 | Valint et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,500,481 B1 | 12/2002 | Vanderlaan et al. |
| 6,521,352 B1 | 2/2003 | Chabrecek et al. |
| 6,534,559 B1 | 3/2003 | Vanderlaan et al. |
| 6,586,038 B1 | 7/2003 | Chabrecek et al. |
| 6,623,747 B1 | 9/2003 | Chatelier et al. |
| 6,627,124 B1 | 9/2003 | Herbrechtsmeier et al. |
| 6,683,062 B2 | 1/2004 | Opolski |
| 6,719,929 B2 | 4/2004 | Winterton et al. |
| 6,730,366 B2 | 5/2004 | Lohmann et al. |
| 6,734,321 B2 | 5/2004 | Chabrecek et al. |
| 6,762,264 B2 | 7/2004 | Künzler et al. |
| 6,793,973 B2 | 9/2004 | Winterton et al. |
| 6,800,225 B1 | 10/2004 | Hagmann et al. |
| 6,811,805 B2 | 11/2004 | Gilliard et al. |
| 6,835,410 B2 | 12/2004 | Chabrecek et al. |
| 6,838,491 B1 | 1/2005 | Vanderlaan et al. |
| 6,866,936 B2 | 3/2005 | Opolski |
| 6,867,245 B2 | 3/2005 | Iwata et al. |
| 6,878,399 B2 | 4/2005 | Chabrecek et al. |
| 6,881,269 B2 | 4/2005 | Matsuzawa et al. |
| 6,896,926 B2 * | 5/2005 | Qiu ........................ A61L 27/34 427/2.1 |
| 6,923,978 B2 | 8/2005 | Chatelier et al. |
| 6,940,580 B2 * | 9/2005 | Winterton ............... A61L 27/34 351/159.33 |
| 6,995,192 B2 | 2/2006 | Phelan et al. |
| 7,078,074 B2 | 7/2006 | Matsuzawa et al. |
| 7,268,198 B2 | 9/2007 | Kunzler et al. |
| 7,384,590 B2 | 6/2008 | Kelly et al. |
| 7,387,759 B2 | 6/2008 | Kelly et al. |
| 7,402,318 B2 * | 7/2008 | Morris .................... A61L 27/34 424/422 |
| 7,461,937 B2 | 12/2008 | Steffen et al. |
| 7,540,609 B2 | 6/2009 | Chen et al. |
| 7,572,841 B2 | 8/2009 | Chen et al. |
| 7,605,190 B2 | 10/2009 | Moszner et al. |
| 7,798,639 B2 * | 9/2010 | Winterton ............... A61L 27/34 351/159.33 |
| 7,915,323 B2 | 3/2011 | Awasthi et al. |
| 7,977,430 B2 | 7/2011 | Devlin et al. |
| 8,044,112 B2 | 10/2011 | Matsuzawa |
| 8,048,968 B2 | 11/2011 | Phelan et al. |
| 8,129,442 B2 | 3/2012 | Ueyama et al. |
| 8,147,897 B2 | 4/2012 | Ferreiro et al. |
| 8,158,192 B2 | 4/2012 | Bothe et al. |
| 8,404,759 B2 | 3/2013 | Phelan et al. |
| 8,420,711 B2 | 4/2013 | Awasthi et al. |
| 8,480,227 B2 | 7/2013 | Qiu et al. |
| 8,524,850 B2 | 9/2013 | Ueyama et al. |
| 8,529,057 B2 | 9/2013 | Qiu et al. |
| 8,703,891 B2 | 4/2014 | Broad |
| 8,772,367 B2 | 7/2014 | Saxena et al. |
| 8,835,525 B2 | 9/2014 | Kuyu et al. |
| 8,865,789 B2 | 10/2014 | Yao et al. |
| 8,937,110 B2 | 1/2015 | Alli et al. |
| 8,937,111 B2 | 1/2015 | Alli et al. |
| 8,993,651 B2 | 3/2015 | Chang et al. |
| 9,151,873 B2 | 10/2015 | Chang et al. |
| 9,156,213 B2 | 10/2015 | Alli et al. |
| 9,187,601 B2 | 11/2015 | Huang et al. |
| 9,377,562 B2 * | 6/2016 | Fujisawa ................. A61L 27/18 |
| 9,720,138 B2 | 8/2017 | Chang et al. |
| 9,778,488 B2 * | 10/2017 | Fujisawa ................. A61L 27/18 |
| 2005/0179862 A1 * | 8/2005 | Steffen ............. B29D 11/00067 351/159.33 |
| 2007/0122540 A1 | 5/2007 | Salamone et al. |
| 2008/0142038 A1 | 6/2008 | Kunzler et al. |
| 2009/0145086 A1 | 6/2009 | Reynolds et al. |
| 2009/0145091 A1 | 6/2009 | Connolly et al. |
| 2012/0026457 A1 | 2/2012 | Qiu et al. |
| 2012/0088843 A1 | 4/2012 | Chang et al. |
| 2012/0088844 A1 | 4/2012 | Kuyu et al. |
| 2012/0088861 A1 | 4/2012 | Huang et al. |
| 2012/0137635 A1 | 6/2012 | Qiu et al. |
| 2012/0244088 A1 | 9/2012 | Saxena et al. |
| 2012/0245249 A1 | 9/2012 | Saxena et al. |
| 2014/0171543 A1 | 6/2014 | Chang et al. |
| 2014/0179867 A1 | 6/2014 | Nunez et al. |
| 2014/0240660 A1 * | 8/2014 | Fujisawa ................. G02B 1/18 351/159.33 |
| 2014/0285765 A1 * | 9/2014 | Fujisawa .......... B29D 11/00067 351/159.33 |

(56) References Cited

U.S. PATENT DOCUMENTS

2016/0061995 A1 3/2016 Chang et al.
2017/0165930 A1 6/2017 Morgan et al.

OTHER PUBLICATIONS

Mattox, D.M.; The Application of Plasmas to Thin Film Deposition Processes, O. Auciello et al. (eds.), Plasma-Surface Interactions and Processing of Materials, pp. 377-399, 1990, Kluwer Academic Publishers.
Brennan, Noel; Contact Lens-Based Correlates of Soft Lens Wearing Comfort; Optometry and Vision Science, 2009; Abstract.
Chantal Coles and Noel Brennan; Coefficient of Friction and Soft Contact Lens Comfort, American Academy of Optometry, Optometry and Vision Science, 2012; Abstract.
N. Dilsiz and G. Akovali; Plasma polymerization of selected organic compounds; Polymer, Elsevier Science Ltd, 1996, vol. 37, No. 2, pp. 333-342.
Alison C. Dunn, Juan Manuel Uruena, Yuchen Huo, Scott S. Perry, Thomas E. Angelini, and W. Gregory Sawyer, Lubricity of Surface Hydrogel Layers; Tribol Lett, 2013, 49, pp. 371-378.
Desmond Fonn; The Clinical Relevance of Contact Lens Lubricity, Using science to provide better comfort for contact lens wearers; Contact Lens Spectrum, Jun. 2013.
Chung-Peng Ho and H. Yasuda; Ultrathin Coating of Plasma Polymer of Methane Applied on the Surface of Silicone Contact Lenses; Journal of Biomedical Materials Research, vol. 22, pp. 919-937 (1988); Rolla, Missouri.
Lyndon Jones, Noel A. Brennan, Jose Gonzalez-Merijome, John Lally, Carole Maldonado-Codina, Tannin A. Schmidt, Lakshman Subbaraman, Graeme Young, Jason J. Nichols, The TFOS International Workshop on Contact Lens Discomfort: Report of the Contact Lens Materials, Design and Care Subcommittee; Investigative Ophthalmology & Visual Science, The Association for Research in Vision and Ophthalmology, Inc., Oct. 2013, vol. 54, No. 11, pp. 37-70.
Jami Kern, Joseph Rappon, Erich Bauman, and Ben Vaughn; Assessment of the relationship between contact lens coefficient of friction and subject lens comfort; ARVO Annual Meeting Abstract; Investigative Ophthalmology & Visual Science, Jun. 2013, vol. 54, 494, Abstract.
Seong Han Kim, Aric Opdahl, Chris Marmo, Gabor A. Somorjai; AFM and SFG studies of pHEMA-based hydrogel contact lens surfaces in saline solution: adhesion, friction, and the presence of non-crosslinked polymer chains at the surface; Biomaterials 23, Elsevier Science Ltd., 2002, pp. 1657-1666.
Seong Han Kim, Chris Marmo, Gabor A. Somorjai; Friction studies of hydrogel contact lenses using AFM: non-crosslinked polymers of low friction at the surface; Biomaterials 22, Elsevier Science Ltd., 2001, pp. 3285-3294.
Kyung-Ah Kwon, Rebecca J. Shipley, Mohan Edirisinghe, Daniel G. Erza, Geoff Rose, Serena M. Best and Ruth E. Cameron, High-speed camera characterization of voluntary eye blinking kinematics; Journal of the Royal Society Interface, 2013, 10: 20130227.
Yu-Chin Lai and Gary D. Friends; Surface wettability enhancement of silicone hydrogel lenses by processing with polar plastic molds; John Wiley & Sons, Inc., 1997, pp. 349-356.
Mingjie Liu, Yasuhiro Ishida, Yasuo Ebina, Takayoshi Sasaki, Takaaki Hikima, Masaki Takata, and Takuzo Aida; An anisotropic hydrogel with electrostatic repulsion between cofacially aligned nanosheets; Nature, vol. 517, Jan. 2015, Macmillan Publishers Limited, pp. 68-72.
A. C. Rennie, P. L. Dickrell, and W. G. Sawyer; Friction coefficient of soft contact lenses: measurements and modeling; Tribology Letters, vol. 18, No. 4, Apr. 2005, pp. 499-504.
M. Roba, E G. Duncan, G. A. Hill, N. D. Spencer, and S. G. P. Tosatti; Friction Measurements on Contact Lenses in Their Operating Environment; Tribol Lett, 2011,44, pp. 387-397.
Alyra J. Shaw, Michael J. Collins, Brett A. Davis, and Leo G. Carney; Eyelid Pressure and Contact with the Ocular Surface; Investigative Ophthalmology & Visual Science, Apr. 2010, vol. 51, No. 4, pp. 1911-1917.
Lakshman N. Subbaraman and Lyndon W. Jones; Measuring Friction and Lubricity of Soft Contact Lenses: A Review; Contact Lens Spectrum; 2013.
John M. Tiffany; Measurement of wettability of the corneal epithelium II. Contact Angle Method; Acta Ophthalmologica; 1990, vol. 68, pp. 182-187.
Juan Manuel Uruena, Angela A. Pitenis, Ryan M. Nixon, Kyle D. Schulze, Thomas E. Angelini and W. Gregory Sawyer; Mesh Size Control of Polymer Fluctuation Lubrication in Gemini Hydrogels; Biotribology 1-2, 2015, pp. 24-29.
Jalaiah Varikooty, Nancy Keir, Doris Richter, Lyndon W. Jones, Craig Woods, and Desmond Fonn; Comfort Response of Three Silicone Hydrogel Daily Disposable Contact Lenses, Optometry and Vision Science, American Academy of Optometry, 2013, vol. 90, No. 9, pp. 945-953.
H. Yasuda; Glow Discharge Polymerization; Journal of Polymer Science: Macromolecular Reviews, John Wiley & Sons, Inc., 1981, vol. 16, pp. 199-293.
Frank Jansen; Chapter 1, Plasma Deposition Processes; Plasma Deposited Thin Films, Editors—J. Mort and F. Jansen; CRC Press, Inc., 1986, pp. 1-19.
R. Hartmann; Plasma Polymerisation: Grundlagen, Technik and Anwendung, Jahrb. Oberflächentechnik (1993) 49, pp. 283-296; Google translated to "Yearbook Basic technology Tape 49, Plasma Basics, technology and applications." No translation was available other than a rough Google translation that is attached.
V. Ngai, JB Medley, L Jones, J Forrest, J Teichroeb; Friction of Contact Lenses: Silicone Hydrogel versus Conventional Hydrogel; Life Cycle Tribology, Tribology and Interface Engineering Series, 2005, 48, pp. 371-379.
Robert C. Tucker, Brad Quinter, Dharmesh Patel, John Pruitt and Jared Nelson; Qualitative and Quantitative Lubricity of Experimental Contact Lenses; Investigative Ophthalmology & Visual Science, 2012, 53, E-Abstract 6093, pp. 1-2.
Bo Zhou, Yuanting Li, Nicholas X. Randall, Lei Li; A Study of the Frictional Properties of Senofilcon-A Contact Lenses; Journal of the Mechanical Behavior of Biomedical Materials, 4, 2011, pp. 1336-1342.
Anton W. Koller, "The Friction Coefficient of Soft Contact Lens Surfaces in Relation to Comfort and Performance", Mar. 2014, pp. 1-225.
Lakshman N. Subbaraman et al., "Measuring Contact Lens Friction", Contact Lens Spectrum, Jan. 2016, pp. 1-7.

* cited by examiner

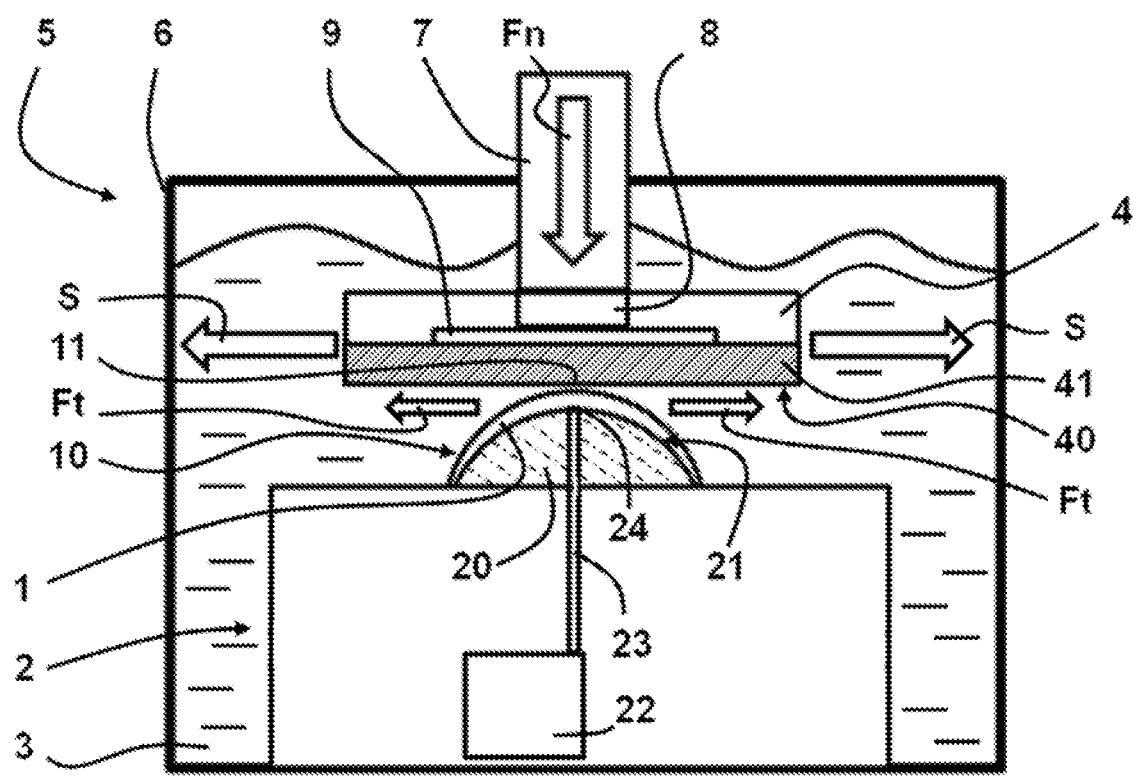

METHOD AND APPARATUS FOR DETERMINING A COEFFICIENT OF FRICTION AT A TEST SITE ON A SURFACE OF A CONTACT LENS

This application claims the benefit under 35 USC § 119(e) of U.S. provisional application No. 62/549,758 filed 24 Aug. 2017, incorporated by reference in its entirety.

The present invention relates to a method and an apparatus for determining a coefficient of friction at a test site on a surface of a contact lens, in particular a soft contact lens.

BACKGROUND OF THE INVENTION

A majority of contact lens users perceive either an insertion discomfort or a decrease of the wearing comfort when continuously wearing a contact lens over an extended period of time. However, contact lens users desire maximum wearing comfort during the entire time of wearing a contact lens. It is generally known that the wearing comfort of a contact lens, among others, depends on the friction between the contact lens and the user's eyelid. During each blink, the eyelid comes in contact with the convex anterior surface of the contact lens and thus is regularly exposed to friction. The "degree of friction" the eyelid is exposed to depends, among others, on the surface roughness of the convex anterior surface of the contact lens and on the presence of lubricating substances at the surface of the lens. These two effects determine the "lubricity" of a contact lens and can be quantified by the so-called "coefficient of friction". Therefore, when desiring to evaluate the wearing comfort of a contact lens it is necessary to find a way of determining its "lubricity", for example by measuring the coefficient of friction.

Two simple methods can be used for evaluating the lubricity of a contact lens, namely, the "finger lubricity method" and the "inclined plane method". In the finger lubricity method, an investigator places a rinsed contact lens between his thumb and index finger and then rubs the contact lens between these fingers in order to perform a subjective rating of the friction and lubricity. In the inclined plane method, a contact lens is placed with its convex anterior surface on an inclined glass plate immersed in a phosphate-buffered saline solution. The contact lens slides down the inclined plate due to gravity. By repeated evaluations, a critical angle of inclination of the plate is determined at which the sliding movement of the contact lens is maintained over a predefined distance. The tangent of the inclination angle of the plate corresponds to a kinetic coefficient of friction.

The main disadvantage of the finger lubricity method is that the determined "lubricity" is based on a subjective evaluation. Moreover, the finger lubricity method may typically be performed only by experienced persons. The main disadvantage of the inclined plane method is that the evaluation of the coefficient of friction is only poorly repeatable. Therefore, both methods fail to provide a reliable determination of the coefficient of friction.

It is therefore an object of the invention to provide a method and an apparatus allowing for determining the coefficient of friction in a reliable and repeatable manner.

SUMMARY OF THE INVENTION

These and other objects of the invention are achieved by a method and an apparatus as specified by the features of the independent claims. Advantageous aspects of the method and the apparatus according to the invention are subject of the dependent claims.

BRIEF DESCRIPTION OF THE DRAWING

FIG. 1 illustrates schematically an apparatus for measuring coefficient of friction of a contact lens according to a preferred embodiment of the invention.

DESCRIPTION OF THE PREFERRED EMBODIMENTS OF THE INVENTION

As used in the specification including the appended claims, the singular forms "a", "an", and "the" include the plural, unless the context explicitly dictates otherwise. Also, whenever features are combined with the term "or", the term "or" is to be understood to also include "and", unless it is evident from the specification that the term "or" must be understood as being exclusive. "About" as used herein means that a number referred to as "about" comprises the recited number plus or minus 1-10% of that recited number.

In the present specification, the terms "above", "below" and "lateral/laterally" are defined in relation to a direction of a force of gravity. "Above" describes a direction against the direction of the force of gravity, "below" describes a direction identical to the direction of the force of gravity and "lateral/laterally" describes a direction perpendicular to the direction of the force of gravity.

"Contact Lens" refers to a structure that has a concave (or posterior) surface and an opposite convex (or anterior) surface and can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

The toric multifocal contact lens 100 has a concave (or posterior) surface 110 and an opposite convex (or anterior) surface 120, and a central axis passing through the apex of the convex (anterior) surface A "hard contact lens" refers a contact lens comprising a hard plastics (e.g., polymethylmethacrylate) as bulk (core) material.

A "rigid gas permeable contact lens" refers to a contact lens comprising a gas permeable material (e.g., a material made from fluorosilicone acrylates) as bulk (core) material.

A "soft contact lens" refers to a contact lens which has an elastic modulus (i.e., Young's modulus) of less than 2.5 MPa.

A soft contact lens can be a non-silicone hydrogel lens, a silicone hydrogel lens or a silicone lens. A "hydrogel contact lens" refers to a contact lens comprising a non-silicone hydrogel bulk (core) material. A "silicone hydrogel contact lens" refers to a contact lens comprising a silicone hydrogel bulk (core) material. A "silicone contact lens" refers to a contact lens made of a crosslinked silicone material as its bulk (or core or base) material which has three-dimensional polymer networks (i.e., polymer matrix), is insoluble in water, and can hold less than about 7.5% (preferably less than about 5%, more preferably less than about 2.5%, even more preferably less than about 1%) by weight of water when fully hydrated.

A hybrid contact lens has a central optical zone that is made of a gas permeable lens material, surrounded by a peripheral zone made of silicone hydrogel or regular hydrogel lens material.

A "hydrogel" or "hydrogel material" refers to a cross-linked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

Generally, different aspects can be combined with each other in any possible manner unless the specification dictates otherwise.

In accordance with the invention, a method for determining a coefficient of friction at a test site on a surface of a contact lens, in particular a soft contact lens, is provided, which comprises the following steps:

attaching the contact lens to a lens holder;

applying a lubricating liquid to the contact lens attached to the lens holder such that the test site is completely covered by the lubricating liquid;

contacting the test site with a counter surface made of lapped aluminum;

applying a predetermined normal load between the counter surface and the test site;

generating a sliding movement between the counter surface and the contact lens in a direction located in a plane perpendicular to the normal load;

measuring a tangential frictional force between the test site and the counter surface along the direction of the sliding movement; and determining the coefficient of friction from the ratio of the measured tangential frictional force to the applied normal load.

In accordance with one aspect of the method according to the invention, the lubricating liquid comprises at least one of saline and an artificial tear fluid.

In accordance with a further aspect of the method according to the invention, the contact lens is attached to the lens holder by means of vacuum.

In accordance with still a further aspect of the method according to the invention, the normal load is about 100 mN or less, preferably about 80 mN, more preferably in the range of about 10 mN to about 50 mN.

Yet in accordance with a further aspect of the method according to the invention, the sliding movement is a linear reciprocating (e.g. oscillatory) movement.

In accordance with a further aspect of the method according to the invention, a full amplitude of the linear reciprocating movement is in the range of about 0.5 mm to about 5 mm, preferably about 1 mm to about 3 mm, more preferably about 1 mm to about 2 mm.

In accordance with still a further aspect of the method according to the invention, a mean velocity of the sliding movement is in the range of about 0.05 mm/s to about 0.3 mm/s, preferably in the range of about 0.1 mm/s to about 0.2 mm/s, more preferably about 0.12 mm/s to about 0.16 mm/s.

Yet in accordance with a further aspect of the method according to the invention, the method further comprises the step of equilibrating the contact lens for a predetermined period of time after applying the lubricating liquid and before contacting the test site with the lapped aluminum counter surface.

In accordance with another aspect of the method according to the invention, the method further comprises the step of flushing the contact lens with a flushing liquid prior to attaching the contact lens to the lens holder.

In accordance with another aspect of the invention, an apparatus for determining a coefficient of friction at a test site on a surface of a contact lens, in particular a soft contact lens is provided.

The apparatus comprises:

a lens holder for securely holding the contact lens attached thereto, the lens holder being arranged at least partially in a receptacle for receiving a lubricating liquid such that the test site is completely coverable by the lubricating liquid when the contact lens is held attached to the lens holder;

a slide comprising a counter surface made of lapped aluminum for contacting the test site;

a load generator configured to apply a predetermined normal load between the counter surface and the test site when being in contact with each other;

a drive configured to generate a sliding movement between the counter surface and the contact lens in a direction located in a plane perpendicular to the normal load; and a force sensor configured to measure a tangential frictional force between the test site and the counter surface along the direction of the sliding movement.

In accordance with one aspect of the apparatus according to the invention, a surface roughness Rz of the lapped aluminum counter surface is in the range of about 4 μm (micrometers) to about 7 μm, preferably about 5 μm to about 6 μm, more preferably 5.2 μm to about 5.4 μm, and a surface roughness Ra of the lapped aluminum counter surface is in the range of about 0.4 μm to about 0.7 μm, preferably about 0.5 μm to about 0.6 μm, more preferably about 0.53 μm to about 0.55 μm.

In accordance with a further aspect of the apparatus according to the invention, the slide includes a circular disc comprising the counter surface.

In accordance with still a further aspect of the apparatus according to the invention, the lens holder comprises a vacuum pump, and a lens support body comprising a convex support surface corresponding to the concave posterior surface of the contact lens and a suction channel extending through the lens support body, wherein the suction channel ends in a suction port at the convex lens support surface and is coupled to the vacuum pump, for holding the contact lens attached to the lens support surface by means of vacuum.

Yet in accordance with a further aspect of the apparatus according to the invention, the lens support body is made of glass.

In accordance with still a further aspect of the apparatus according to the invention, the force sensor is further configured to measure the normal load between the counter surface and the test site when being in contact with each other.

The present invention provides a method and an apparatus for determining a coefficient of friction of a contact lens in a reliable and repeatable manner. Essentially, this is achieved by providing a tribometer test system that includes an appropriate counter surface having a suitable surface material and surface topography so as to be able to deal with various types of contact lenses or contact lens surfaces without adhesion effects and plastic deformation of the contact lens during determination of the coefficient of friction.

For that purpose, the apparatus and the method according to the present invention make use of a counter surface that is made of lapped aluminum. Lapped aluminum has a surface quality that allows for a reduction of adhesion effects and plastic deformation of the contact lens during determination of the coefficient of friction and thus allows for determining the coefficient of friction in a reliable and reproducible manner.

The surface roughness Rz of the lapped aluminum counter surface may be in the range of about 4 µm to about 7 µm, preferably about 5 µm to about 6 µm, more preferably 5.2 µm to about 5.4 µm. The surface roughness Ra of the lapped aluminum counter surface may be in the range of about 0.4 µm to about 0.7 µm, preferably about 0.5 µm to about 0.6 µm, more preferably 0.53 µm to about 0.55 µm. These values for Rz and Ra of the lapped aluminum counter surface are particularly advantageous because the tribological behavior allows for a reliable differentiation between various types of contact lenses or contact lens surfaces.

Both the surface roughness Rz and the surface roughness Ra are known and have the conventional meaning.

The surface roughness Rz denotes an average surface roughness which is obtained by measuring the distance from the highest peak of an individual sampling length to the lowest valley of the same individual sampling length, by adding these measured highest peak to lowest valley distance of the individual sampling lengths, and then dividing the sum of the highest peak to lowest valley distances of the individual sampling lengths by the number of individual sampling lengths.

The surface roughness Ra denotes an average surface roughness which is obtained by measuring at each of a plurality of locations along a sampling length on the surface an individual distance of the surface from a value at which the surface roughness is deemed to be zero (ideal flat surface), by determining the absolute value of each of the measured individual distances, by adding these determined absolute values, and then dividing the sum of determined absolute values by the number of measured distances.

The counter surface may be plane. Alternatively, the counter surface may be curved, in particular spherical or ellipsoidal. For example, the counter surface may have a shape identical to a part of a sphere or an ellipsoid.

The counter surface may be part of a slide of the apparatus that is used to contact the counter surface at a test site on a surface of the contact lens and preferably also to induce a relative sliding movement between the counter surface and the test site. For example, the slide may comprise a circular disc including the counter surface, in particular a plane counter surface. Alternatively, the slide may comprise a sphere or a part thereof including the counter surface. Likewise, the slide may comprise an egg-like object or a part thereof including the counter surface.

The method and apparatus according to the present invention involve a lens holder for securely holding the contact lens attached thereto. Advantageously, the lens holder securely holds the contact lens at a predefined position on the lens holder attached thereto, and thus prevents a displacement of the contact lens when the counter surface and the contact lens are moving relative to each other during determination of the coefficient of friction.

The lens holder may include a lens support body having a convex support surface corresponding to the concave posterior surface of the contact lens. Preferably, the lens holder may hold the lens by means of vacuum. For this purpose, the lens holder may comprise a suction channel extending through the lens support body. The suction channel may end in a suction port at the convex lens support surface. At its other end, the suction channel may be coupled to a vacuum pump. The vacuum pump may be part of the lens holder. The lens support body may also comprise a plurality of suction channels ending in a plurality of suction ports at the convex lens support surface. Securing the contact lens by means of vacuum is particularly advantageous as it reduces the risk of damaging the contact lens surface.

The lens support body may be made of glass. Glass is inert and is capable of withstanding cleaning with organic solvents, and is thus particularly well suited as material for a lens support body that can be repeatedly used. Advantageously, the lens support body may have a curvature that approaches the curvature of a human eye.

The lens holder may be arranged in a receptacle for receiving a lubricating liquid. The receptacle may have, for example, a cylindrical shape. The receptacle allows for covering the contact lens at least partially with the lubricating liquid when the contact lens is held by the lens holder such as to cover at least the test site on the surface of the contact lens. Thus, an optimum and constant lubrication of the test site can be established. The lubricating liquid may comprise saline, in particular phosphate-buffered saline, artificial tear fluid, or mixtures thereof.

For applying a predetermined normal load between the counter surface and the test site when being in contact with each other, the apparatus comprises a load generator. The load generator may be configured to apply the normal load either only to the slide (and via the slide to the counter surface), or only to the lens holder, or to both the slide and the lens holder.

Preferably, the receptacle and the contact lens holder are arranged beneath the slide. However, it may be conceivable that the contact lens holder is arranged above the slide or laterally to the slide. In both cases, it is required that the contact lens is sufficiently lubricated at the test site. "Sufficiently lubricated" means, that at least the test site of the contact lens is covered by the lubricating liquid. Preferably, the entire contact lens is submerged in the lubricating liquid.

The apparatus further comprises a drive configured to generate a sliding movement either of the counter surface or of the lens holder or both, such that the slide and the contact lens may slide relative to each other. The drive may comprise an actuator that is configured to generate a sliding movement between the counter surface and the test site when being in contact with each other. The direction of the sliding movement is in a direction perpendicular to the direction of the normal force generated by the load generator. Thus, the drive allows for generating a relative displacement between the counter surface and the contact lens. The drive may be configured to displace only either the slide or the lens holder. Alternatively, the drive may be configured to displace both, the lens holder and the slide.

Furthermore, the apparatus comprises a force sensor configured to measure a tangential frictional force between the test site of the contact lens and the counter surface. The direction of the measured tangential frictional force is parallel to the direction of the relative sliding movement between the counter surface and the test site. The force sensor may be further configured to additionally measure the normal load between the counter surface and the test site when being in contact with each other.

Furthermore, the apparatus may comprise a controller for controlling the relative sliding movement and the normal load. The controller may further be operatively coupled with the force sensor and configured to evaluate the tangential frictional force and to calculate the coefficient of friction of the test site of the contact lens. Thus, the controller preferably allows an automatic determination of the coefficient of friction.

As regards the method for determining the coefficient of friction of a contact lens according to the present invention, the contact lens is first attached to the lens holder. Preferably, the contact lens is securely held by means of vacuum.

Prior to attaching the contact lens to the lens holder, the contact lens may be flushed with a flushing liquid. The flushing liquid may be fresh saline or may be a phosphate-buffered saline. In particular, the flushing liquid may be the same as the lubricating liquid. For example, the contact lens may be flushed for a time period of about 20 seconds.

When being attached to the lens holder, a lubricating liquid is applied to the contact lens. The lubricating liquid covers the test site on the convex anterior surface of the contact lens. In particular, the contact lens may be arranged in a bath of the lubricating liquid such that at least the test site is covered by the lubricating liquid. This allows for continuous lubrication during determination of the coefficient of friction, thus mimicking real lubrication conditions in a human's eye. Moreover, reliability of the determined coefficient of friction is increased.

Thereafter, the test site of the contact lens and the counter surface are brought into contact with each other. This may be done by either moving the counter surface towards the contact lens, or vice versa by moving the contact lens towards the counter surface. Alternatively, the counter surface and the contact lens may be moved simultaneously towards each other until the counter surface and the test site of the contact lens are in contact.

Preferably, the contact lens is equilibrated for a predetermined period of time after applying the lubricating liquid, but before contacting the counter surface. Advantageously, the contact lens may be equilibrated for about 120 seconds. This avoids dehydration of the contact lens surfaces.

After having been brought into contact with each other, a predetermined normal load is applied between the counter surface and the test site. With regard to the apparatus according to the present invention, the normal load may applied by a load generator. The normal load may be about 100 mN or less, preferably about 80 mN or less, more preferably about 10 mN to about 50 mN. These values prove advantageous as they can be applied to various types of contact lenses without causing plastic deformation of the contact lens.

The normal load may be applied only to the counter surface, when being in contact with the test site of the contact lens, for example via the slide. Accordingly, the counter surface is pressed against the test site of the contact lens. Alternatively, the normal load may be applied only to the contact lens, for example via the lens holder. In this case, the test site of the contact lens is pressed against the counter surface. Likewise, the normal load may be simultaneously applied to both, the counter surface and the contact lens. In this case, the test site of the contact lens and the counter surface are pressed against each other. The normal load is oriented parallel to a normal to the counter surface or a normal to the test site on the surface of the contact lens.

For simulating the sliding movement of a human's eyelid on the anterior front surface of the contact lens, a sliding movement is generated between the counter surface and the contact lens in a plane perpendicular to the normal load. The relative sliding movement may be performed by moving the counter surface only, for example by movement of the slide. Accordingly, the counter surface (or the slide, respectively) is laterally moved along the test site on the contact lens. Alternatively, the relative sliding movement may be performed by moving the contact lens only, for example by movement of the lens holder. In this case, the test site of the contact lens is laterally moved along the counter surface. Likewise, the relative sliding movement may be applied to both, the contact lens and the counter surface.

The sliding movement may be a linear movement. In particular, the sliding movement may be a linear reciprocating movement. A full amplitude of the linear reciprocating movement or linear oscillatory movement may be in the range of about 0.5 mm to about 5 mm, in particular in the range of about 1 mm to about 3 mm, preferably about 1 mm to about 2 mm.

The sliding movement may have a mean velocity in the range of about 0.05 mm/s (millimeters per second) to about 0.3 mm/s, in particular in the range of about 0.1 mm/s to about 0.2 mm/s, of about 0.12 mm/s to about 0.16 mm/s.

For determining the coefficient of friction, a tangential frictional force between the test site and the counter surface along the direction of the sliding movement is measured. With regard to the apparatus according to the present invention, the tangential frictional force is measured by a force sensor. The direction of the measured tangential frictional force is parallel to the direction of the relative sliding movement between the counter surface and the test site. The tangential frictional force depends on the normal load applied and the velocity between the counter surface and the test site (tribological behavior at the test site).

The coefficient of friction is determined from the ratio of the measured tangential frictional force to the applied normal load.

Multiple consecutive measurements of the coefficient of friction may be performed in order to evaluate the contact lens behavior over time. In this case, between each measurement, the counter surface of the slide may be cleaned by rinsing it with isopropanol.

The test duration for measuring the tangential frictional force may be in the range of about 6 seconds to about 3600 seconds. In particular, the test duration may be in the range of about 60 seconds to about 360 seconds. Preferably, the test duration may be about 180 seconds.

The measuring of the coefficient of friction of the contact lens anterior surface may be performed at ambient room temperature.

The described method and apparatus allow for the determination of the coefficient of friction of a surface of a contact lens in a reliable and repeatable manner. This allows for determination of the coefficient of friction in a reproducible manner and allows for comparison of the test results with test results of other contact lenses performed with the same method and apparatus.

FIG. 1 shows an exemplary embodiment of an apparatus 5 according to the invention which is configured for determining a coefficient of friction at a test site 11 on the convex anterior surface 10 of a soft contact lens 1.

The apparatus 5 comprises a slide 4 which comprises a circular disc 41 having a plane counter surface 40 that is configured to slide on the test site 11 of the contact lens 1.

The contact lens 1 is attached to a lens holder 2 comprising a lens support body 20 made of glass for supporting the contact lens 1. The lens support body 20 has a support surface 21 being in contact with the concave posterior surface of the contact lens 1 upon attaching the contact lens thereto. Preferably, the support surface 21 of lens support body 20 is convex corresponding to the concave posterior surface of the contact lens 1. Furthermore, the lens holder 2 comprises a suction channel 23 which connects a vacuum pump 22 with a suction port 24 arranged at the support surface 21 of the lens support body 20. The vacuum pump 22 is configured to generate a vacuum for securely holding the contact lens 1 attached to the lens holder 2.

As can be further seen from FIG. 1, the support body 20 of the lens holder 2 is arranged in a receptacle 6 which is filled with a lubricating liquid 3. The test site 11 of the contact lens 1 is completely covered with the lubricating liquid 3. The lubricating liquid 3 is saline.

The apparatus further comprises a drive 8 configured to generate a lateral sliding movement of the slide 4 such that the plane counter surface 40 may slide over the test site 11 of the contact lens 1. The direction S of the sliding movement is indicated by two horizontal arrows next to the slide 4. The slide 4 is arranged above the lens holder 2. The slide 4 comprises a circular disc 41 which includes the plane counter surface 40. The plane counter surface 40 is made of lapped aluminum and has a surface roughness Rz of about 5.4 μm and a surface roughness Ra of about 0.55 μm.

The apparatus 5 further comprises a load generator 7 that is configured to press the counter surface 40 against the test site 11. The load generator 7 is configured to apply a normal load Fn to the slide 4 and thus to the counter surface 40. The normal load Fn is indicated by a vertical arrow in FIG. 1.

The apparatus 5 further comprises a force sensor 9 configured to measure a tangential frictional force Ft between the test site 11 and the counter surface 40 along the direction S of the sliding movement. The tangential frictional force Ft is indicated by two horizontal arrows next to the test site 11 in FIG. 1. The force sensor 9 may be further configured to measure the normal load Fn between the counter surface 40 and the test site 11 when being in contact with each other.

The principle of operation of the apparatus 5 is described now. First, the contact lens 1 is flushed with a flushing liquid (phosphate-buffered saline) for 20 seconds and then arranged on the support surface 21 of the lens support body 20 of the lens holder 2. By activating the vacuum pump 22, a vacuum is generated which allows for securely holding the contact lens 1 on the lens holder 2.

Thereafter, the lubricating liquid 3 (saline) is filled into the receptacle 6 in which the lens support body 20 of the lens holder 2 and the contact lens 1 are arranged. The lubricating liquid 3 is filled until the test site 11 of the contact lens 1 is completely covered with the lubricating liquid 3. After that, the contact lens 1 is equilibrated in the saline for 120 seconds.

Next, the slide 4 is moved towards the contact lens 1 until the counter surface 40 is in contact with the test site 11. When being in contact, the load generator 7 applies the normal load Fn to the slide 4, thus pressing the counter surface 40 against the test site 11 of the contact lens 1. The normal load Fn may be about 50 mN.

The drive 8 generates the sliding movement between the counter surface 40 and the contact lens 1 in a plane perpendicular to the normal load Fn. For this purpose, the drive 8 acts on the slide 4 to move in a lateral direction S. Preferably, the sliding movement is a linear reciprocating movement. The full amplitude may be about 2 mm. The mean velocity may be about 0.16 mm/s (millimeters/second).

During the sliding movement, the tangential frictional force Ft between the test site 11 and the counter surface 40 is measured along the direction S of the sliding movement.

The coefficient of friction is determined from the ratio of the measured tangential frictional force Ft to the applied normal load Fn.

While embodiments of the invention have been described with the aid of the drawing, it is obvious that many changes and/or modifications are possible without departing from the teaching underlying the invention. Therefore, such changes or modifications are intended to be within the scope of protection which is defined by the appended claims.

The invention claimed is:

1. A method for determining a coefficient of friction at a test site on a surface of a contact lens the method comprising the following steps:
    attaching the contact lens to a lens holder, wherein the lens holder comprises a vacuum pump and a lens support body comprising a convex lens support surface corresponding to the concave posterior surface of the contact lens and a suction channel extending through the lens support body, wherein the suction channel ends in a suction port at the convex lens support surface and is coupled to the vacuum pump, for holding the contact lens attached to the convex lens support surface by means of vacuum;
    applying a lubricating liquid to the contact lens attached to the lens holder such that the test site is completely submerged by the lubricating liquid;
    contacting the test site with a counter surface made of lapped aluminum;
    applying a predetermined normal load (Fn) between the counter surface and the test site;
    generating a sliding movement between the counter surface and the contact lens in a direction located in a plane perpendicular to the normal load (Fn);
    measuring a tangential frictional force (Ft) between the test site and the counter surface along the direction of the sliding movement;
    determining the coefficient of friction from the ratio of the measured tangential frictional force (Ft) to the applied normal load (Fn).

2. The method of claim 1, wherein the lubricating liquid comprises at least one of saline and an artificial tear fluid.

3. The method of claim 2, wherein the normal load (Fn) is about 100 mN or less.

4. The method of claim 3, wherein the sliding movement is a linear reciprocating movement.

5. The method of claim 4, wherein a full amplitude of the linear reciprocating movement is in the range of about 0.5 mm to about 5 mm.

6. The method of claim 5, wherein a mean velocity of the sliding movement is in the range of about 0.05 mm/s to about 0.3 mm/s.

7. The method of claim 6, further comprising the step of equilibrating the contact lens for a predetermined period of time after applying the lubricating liquid and before contacting the test site with the lapped aluminum counter surface.

8. The method of claim 6, further comprising the step of flushing the contact lens with a flushing liquid prior to attaching the contact lens to the lens holder.

9. The method of claim 4, further comprising the step of equilibrating the contact lens for a predetermined period of time after applying the lubricating liquid and before contacting the test site with the lapped aluminum counter surface.

10. The method of claim 4, further comprising the step of flushing the contact lens with a flushing liquid prior to attaching the contact lens to the lens holder.

11. An apparatus for determining a coefficient of friction at a test site on a surface of a contact lens, the apparatus comprising:

a lens holder for securely holding the contact lens attached thereto, the lens holder being arranged in a receptacle for receiving a lubricating liquid such that the test site is completely submersible by the lubricating liquid when the contact lens is held attached to the lens holder, wherein the lens holder comprises a vacuum pump and a lens support body comprising a convex lens support surface corresponding to the concave posterior surface of the contact lens and a suction channel extending through the lens support body, wherein the suction channel ends in a suction port at the convex lens support surface and is coupled to the vacuum pump, for holding the contact lens attached to the convex lens support surface by means of vacuum;

a slide comprising a counter surface made of lapped aluminum for contacting the test site;

a load generator configured to apply a predetermined normal load (Fn) between the counter surface and the test site when being in contact with each other;

a drive configured to generate a sliding movement between the counter surface and the contact lens in a direction located in a plane perpendicular to the normal load (Fn); and a force sensor configured to measure a tangential frictional force (Ft) between the test site and the counter surface along the direction of the sliding movement.

12. The apparatus according to claim 11, wherein a surface roughness Rz of the lapped aluminum counter surface is in the range of about 4 μm to about 7 μm, and wherein a surface roughness Ra of the lapped aluminum counter surface is in the range of about 0.4 μm to about 0.7 μm.

13. The apparatus of claim 12, wherein the slide includes a circular disc comprising the counter surface.

14. The apparatus according to claim 11, wherein the lens support body is made of glass.

15. The apparatus of claim 14, wherein the force sensor is further configured to measure the normal load (Fn) between the counter surface and the test site when being in contact with each other.

* * * * *